(12) United States Patent
Choe et al.

(10) Patent No.: US 8,391,002 B2
(45) Date of Patent: Mar. 5, 2013

(54) SLIDE TYPE PORTABLE TERMINAL

(75) Inventors: Sun-Jong Choe, Gyeonggi-do (KR);
Yu-Chul Chang, Gyeonggi-do (KR);
Young-Jin An, Gyeonggi-do (KR)

(73) Assignee: Samsung Electronics Co., Ltd.,
Samsung-ro, Yeongtong-gu, Suwon-si,
Gyeonggi-do (KR)

( * ) Notice: Subject to any disclaimer, the term of this patent is extended or adjusted under 35 U.S.C. 154(b) by 169 days.

(21) Appl. No.: 12/714,645

(22) Filed: Mar. 1, 2010

(65) Prior Publication Data

US 2010/0226081 A1    Sep. 9, 2010

(30) Foreign Application Priority Data

Mar. 5, 2009    (KR) .................. 10-2009-0018907

(51) Int. Cl.
*H05K 5/00* (2006.01)
*H05K 7/00* (2006.01)
*G09G 5/00* (2006.01)
*G11B 17/00* (2006.01)

(52) U.S. Cl. ......... 361/679.56; 361/679.57; 361/679.58; 361/679.59; 361/679.08; 345/156; 345/168; 345/169; 369/253

(58) Field of Classification Search ............. 361/679.01, 361/679.02, 679.08, 679.09, 679.3, 679.55–679.59; 345/156, 157, 168, 169, 184; 455/325, 556.1, 455/550.1, 90.1, 575.1; 369/282, 291, 253, 369/44.16, 75.5; 70/357, 367, 406, 381, 70/491
See application file for complete search history.

(56) References Cited

U.S. PATENT DOCUMENTS 7,084,345 B1 * 8/2006 Chen et al. ................. 174/545
2006/0176654 A1 * 8/2006 Kfoury .................... 361/681

FOREIGN PATENT DOCUMENTS

KR    10-2004-0044213 A    5/2004

* cited by examiner

*Primary Examiner* — Jayprakash N Gandhi
*Assistant Examiner* — Jerry Wu
(74) *Attorney, Agent, or Firm* — Cha & Reiter, LLC

(57) ABSTRACT

Disclosed is a slide type portable terminal which includes a clean back cover covering a back surface of a sliding housing during the sliding of the sliding housing. The cover prevents the back surface from being exposed. The terminal further has a double sliding assembly structure to improve the assembly strength in sliding. The slide type portable terminal including a body housing and a sliding housing sliding relative to the body housing while facing the body housing includes a guide plate formed in the body housing to double guide a sliding of the sliding housing, and a double sliding plate formed in the sliding housing to be double assembled with the guide plate and engaged with the guide plate to slide.

15 Claims, 13 Drawing Sheets

SLIDE TYPE PORTABLE TERMINAL

CLAIM OF PRIORITY

This application claims the benefit of the earlier filing date, under 35 U.S.C. §119(a), to that patent applications entitled "Slide Type Portable Terminal" filed in the Korean Intellectual Property Office on Mar. 5, 2009 and assigned Serial No. 10-2009-0018907, the contents of which are hereby incorporated by reference.

BACKGROUND OF THE INVENTION

1. Field of the Invention

The present invention relates to a slide type portable terminal, and more particularly to a slide type portable terminal that has a double sliding assembly structure.

2. Description of the Related Art

In general, a portable electronic device refers to a device, such as a portable terminal, an MP3 player, a PMP, or the like, with which a user enjoys various content while carrying it. Portable terminals are generally classified according to their appearance into bar-type terminals, flip-type terminals, and folder-type terminals.

The slide type portable terminal includes two housings wherein one housing slides on the other housing in a longitudinal direction to be opened/closed. This type of terminal has found increasing popularity as the design of the portable terminal becomes diversified.

Korean Patent Application No. 2002-71911 filed on Nov. 19, 2002 and filed on Mar. 6, 2003 in the United States Patent Office and afforded Ser. No. 10/379,551, discloses a sliding module incorporated into a portable terminal, which has a pair of housings coupled to each other in such a manner that one of the housings slides relative to the other housing. The disclosed portable terminal is a terminal in which one housing slides to open/close one part of the other housing, in particular, a keypad. One housing of the terminal is assembled with a spring module and the other housing is assembled with a sliding guide shaped like a rail so that the spring module and sliding guide assembles the pair of housings with each other capable of sliding.

Further, recently, the portable terminal includes a clean back cover on a back surface of the sliding housing in order to improve design attraction through covering the back surface of the sliding housing when the sliding housing slides relative to a body housing to protrude.

FIG. 1 is a perspective view illustrating a clean back cover exposed to an outside according to the sliding of a sliding housing in a conventional slide type portable terminal. FIG. 2 is a perspective view illustrating a clean back cover mounted on a sliding plate in a conventional slide type portable terminal. FIG. 3 is a perspective view illustrating a sliding plate mounted with a clean back cover facing a guide plate of a body housing. FIG. 4 is a perspective view illustrating a sliding plate mounted with a clean back cover slidable relative to a guide plate of a body housing in a conventional slide type portable terminal.

As shown in FIGS. 1 to 4, a slide type portable terminal 10 includes a body housing 11, a sliding housing 12 facing the body housing 11, and a clean back cover 13. Referring to FIG. 3, the body housing 11 includes a guide plate 14 and the sliding housing 12 includes a sliding plate 15 that slides in the guide plate 14 according to the sliding of the sliding housing 12, An elastic member (not shown) for providing elasticity during the sliding of the sliding housing 12 is formed between the sliding plate 15 and the guide plate 14. A guide groove 14a is formed on both lateral surfaces of the guide plate 14 so as to set both lateral surfaces of the sliding plate 15 to guide the sliding plate 15 according to the sliding of the sliding housing 12. Further, a guide rail 15a is formed on both lateral surfaces of the sliding plate 15, which is set in the guide groove 14a to slide.

As shown in FIGS. 1 and 2, the clean back cover 13 contacts an internal side of the body housing 11 to cover an upper part of the sliding plate 15 that protrudes from the body housing 11 to be exposed during the sliding of the sliding housing 12. Therefore, the clean back cover 13 is inserted in and extracted from the body housing 11 during the sliding of the sliding housing 12 and improves the design attraction of the slide type portable terminal 10 when being exposed to the outside. Both lateral ends of the clean back cover 13 extend in a longitudinal direction of the sliding housing 12 to be fastened to an assembly plate 15a protruding from both sides of the sliding plate 15 through a fastening member 16, such as a screw.

As shown in FIGS. 3 and 4, due to the position of the assembly plate 15b that assembles the clean back cover unit 13 with the sliding plate 15, the guide rail 15a is positioned in a lower side of the assembly plate 15b. Further, the guide groove 14a is positioned in a lower part of the guide plate 14 so as to be positioned in a lower part of the assembly plate 15b when the guide plate 14 faces the sliding plate 15.

When the sliding housing 12 slides to protrude from the body housing 11, the sliding plate 14 distantly slides from the guide plate 14, whereby causing a problem in that a part of the upper part of the guide groove 14a is not engaged with the sliding plate 15.

Due to such a non-engagement, there is a problem in that the strength of a center of the slide type portable terminal 10 corresponding to an upper part of the guide plate 14 is lessened after the sliding of the sliding housing 12. In addition, there is a strong possibility of breakage of the non-engaged part when a force is applied to the non engaged part or the slide type portable terminal 10 is dropped.

Therefore, the slide type portable terminal capable of improving the assembly strength of the non-engaged part between the guide plate and the sliding plate is necessary.

Further, the slide type portable terminal is essentially necessary in which one rail structure of the guide plate and sliding plate is changed into a double rail structure to improve the assembly strength during the sliding and to assemble the guide plate with the sliding plate after the sliding.

SUMMARY OF THE INVENTION

The present invention provides a slide type portable terminal in which a sliding assembly structure of a sliding housing and a body housing includes a double rail structure to improve the assembly strength between a sliding plate and a guide plate when the sliding plate slides relative to the guide plate, thereby improving the reliability of the terminal.

The present invention provides a slide type portable terminal which includes a clean back cover on a back surface of the sliding housing to cover the back surface of the sliding housing when the sliding housing slides relative to the body housing wherein an assembly unit of the clean back cover is formed in an internal side of the body housing to prevent it from being exposed to the outside.

In accordance with an aspect of the present invention, there is provided a slide type portable terminal including a body housing and a sliding housing sliding relative to the body housing while facing the body housing, the body housing includes a guide plate formed in the body housing to double guide a sliding of the sliding housing, and a double sliding plate formed in the sliding housing to be double engage with the guide plate and engaged with the guide plate to slide.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Exemplary embodiments of the present invention will be described with reference to the accompanying drawings. The construction illustrated in the exemplary embodiments and drawings is merely the preferred embodiments of the present invention, and does not speak for the technical sprit of the present invention. Further, it will be understood by those skilled in the art that various changes and modifications can be made thereto without departing from the technical spirit and scope of the present invention.

Figure 1:
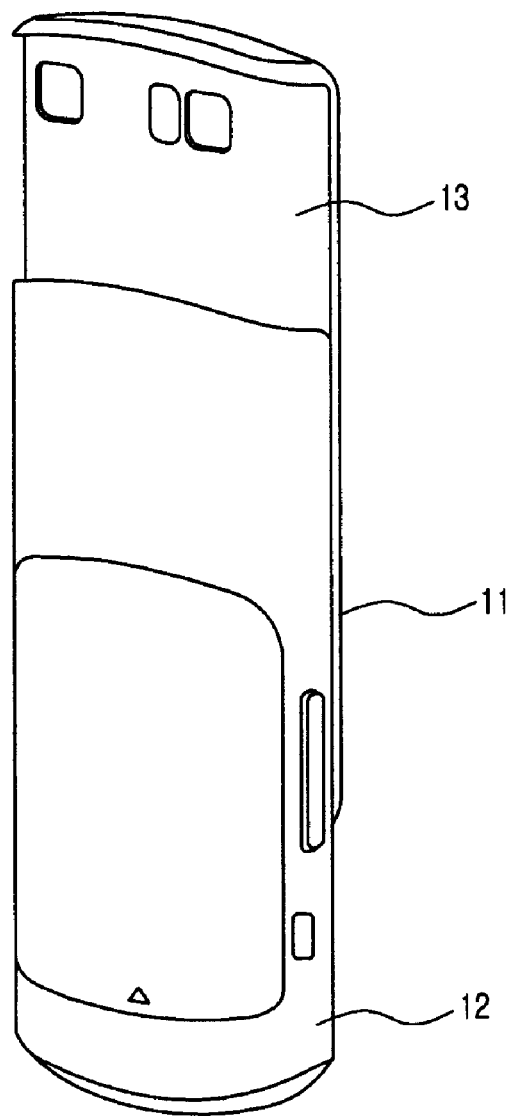
FIG. 1 is a perspective view illustrating a state where a sliding housing including a clean back cover slides relative to a body housing to protrude in a conventional slide type portable terminal.
Figure 2:
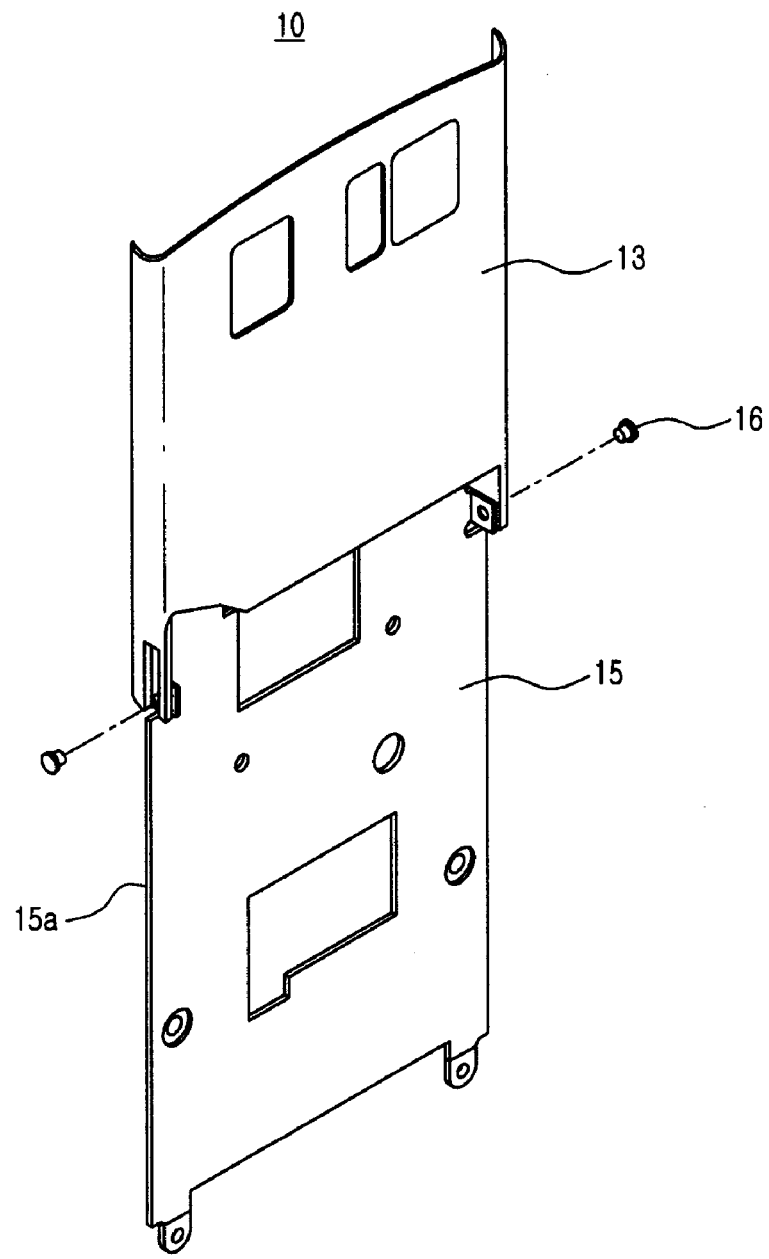
FIG. 2 is a perspective view illustrating a state where a clean back cover is mounted on a sliding plate in a conventional slide type portable terminal.
Figure 3:
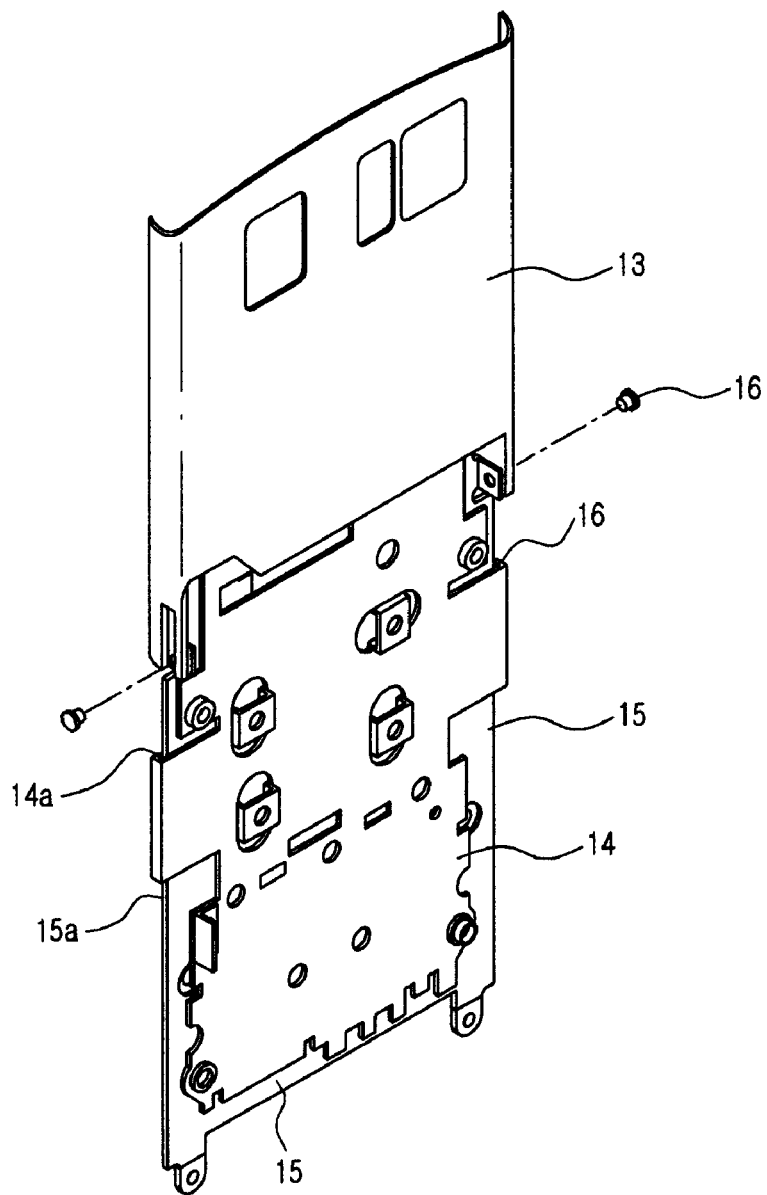
FIG. 3 is a perspective view illustrating a state where a sliding plate including a clean back cover faces a guide plate in a conventional slide type portable terminal.
Figure 4:
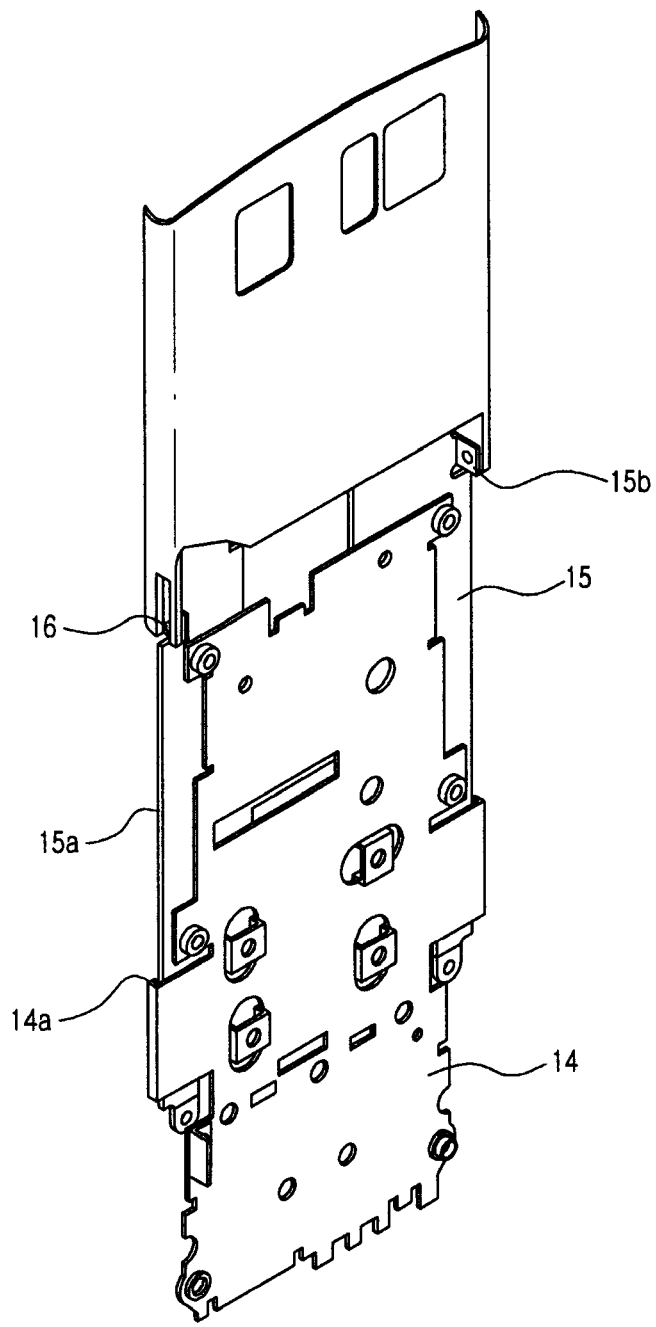
FIG. 4 is a perspective view illustrating a state where a sliding plate including a clean back cover slides relative to a guide plate in a conventional slide type portable terminal.
Figure 5:
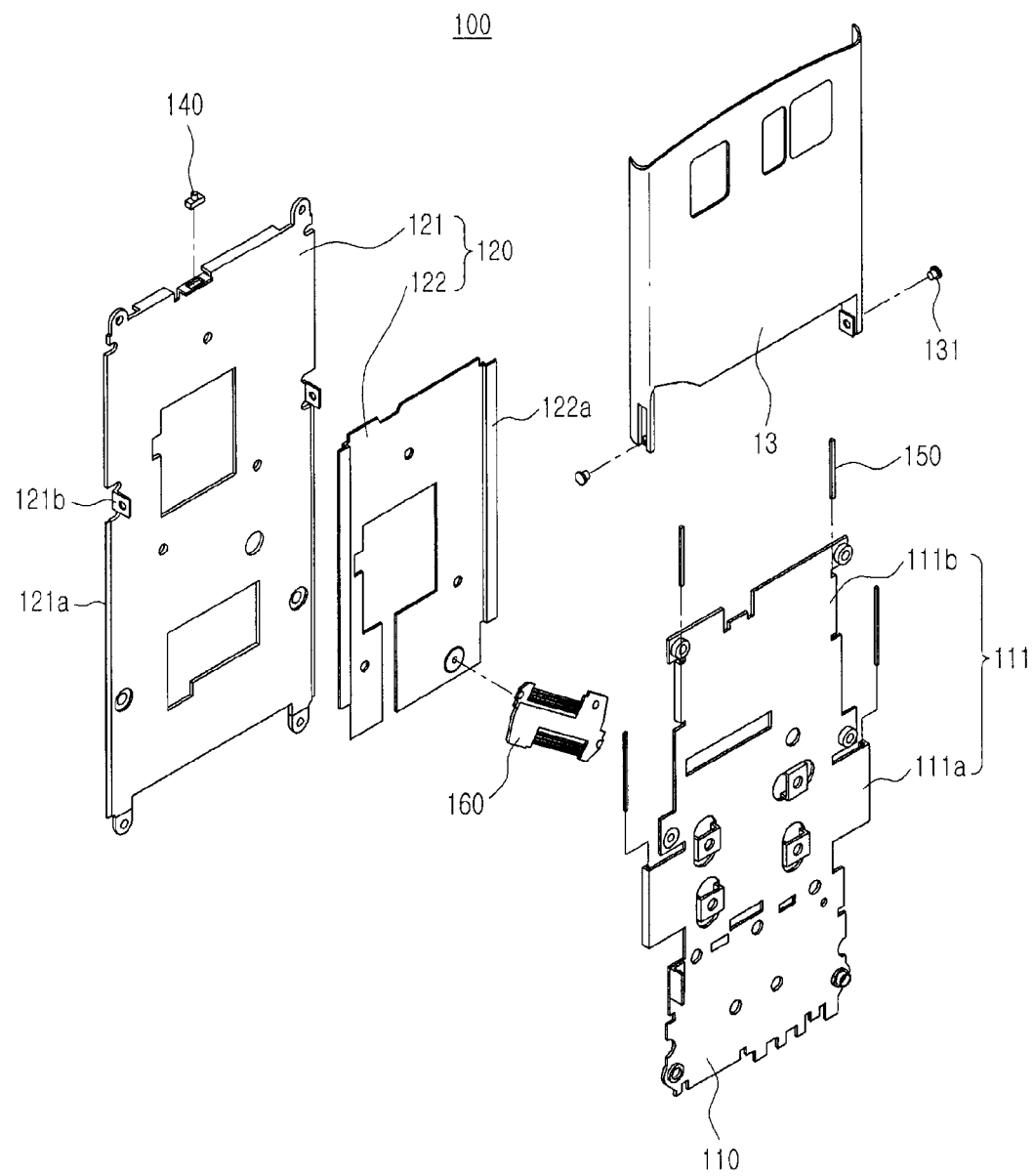
FIG. 5 is an exploded perspective view illustrating a slide type portable terminal according to an embodiment of the present invention.
Figure 6:
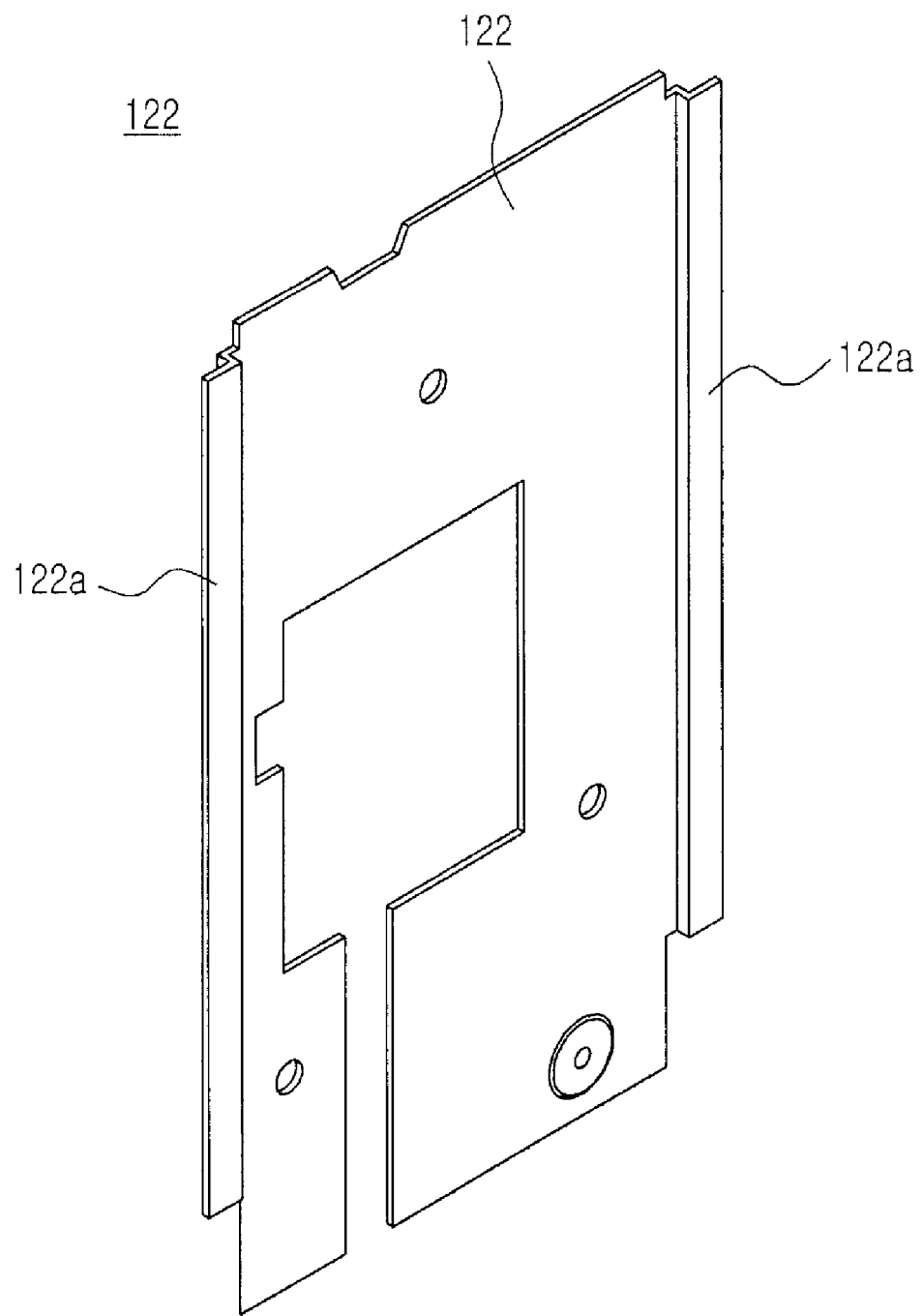
FIG. 6 is a perspective view illustrating an auxiliary sliding member in a slide type portable terminal according to an embodiment of the present invention.

As shown in FIG. 5 a slide type portable terminal 100 includes a guide plate 110 and a double sliding plate 120. The guide plate 110 is formed on the body housing (not shown) so as to double guide the sliding of the sliding housing (not shown). The double sliding plate 120 is formed on the sliding housing, which is engaged with the guide plate 110 to be double assembled with the guide plate 110 to slide (see also FIGS. 10, 11, 13 and 14).

Figure 8:
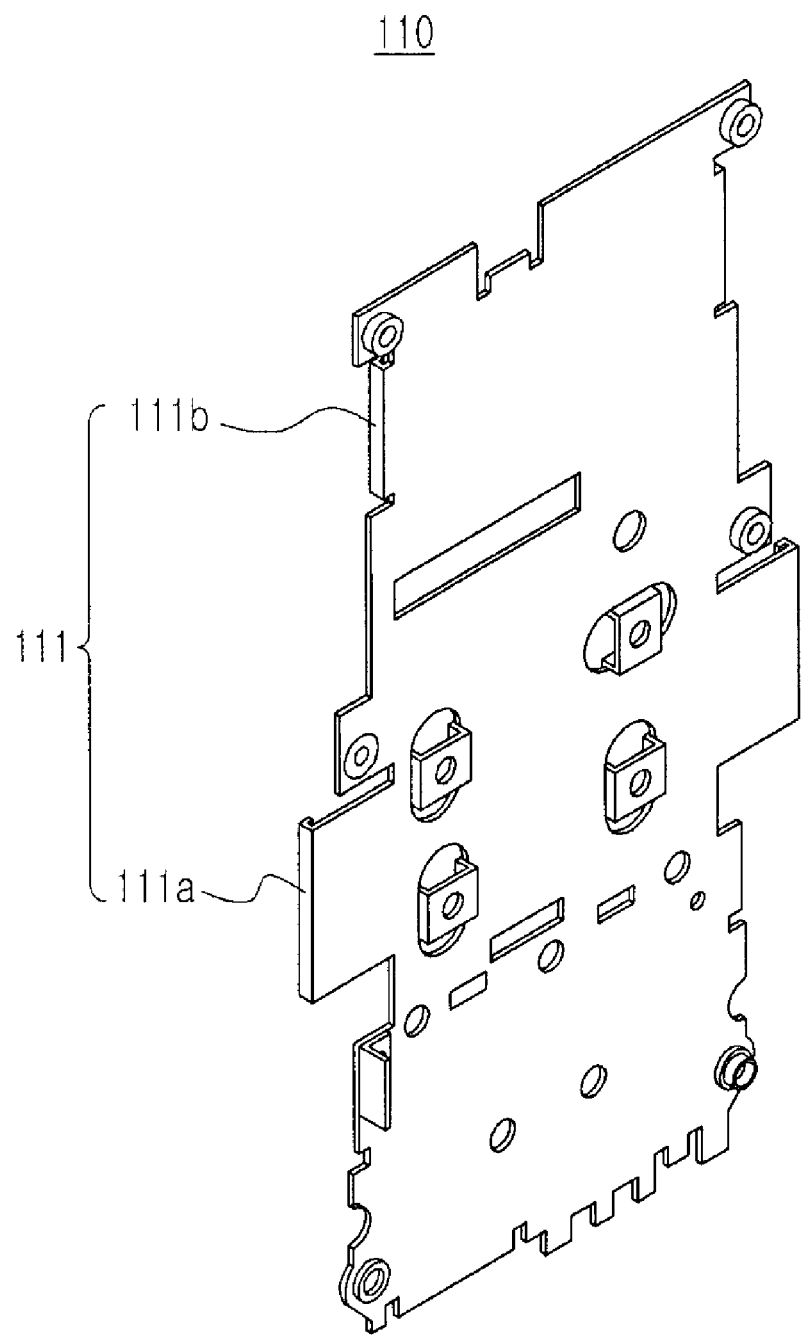
FIG. 8 is a perspective view illustrating a guide plate in a slide type portable terminal according to an embodiment of the present invention.
Figure 9:
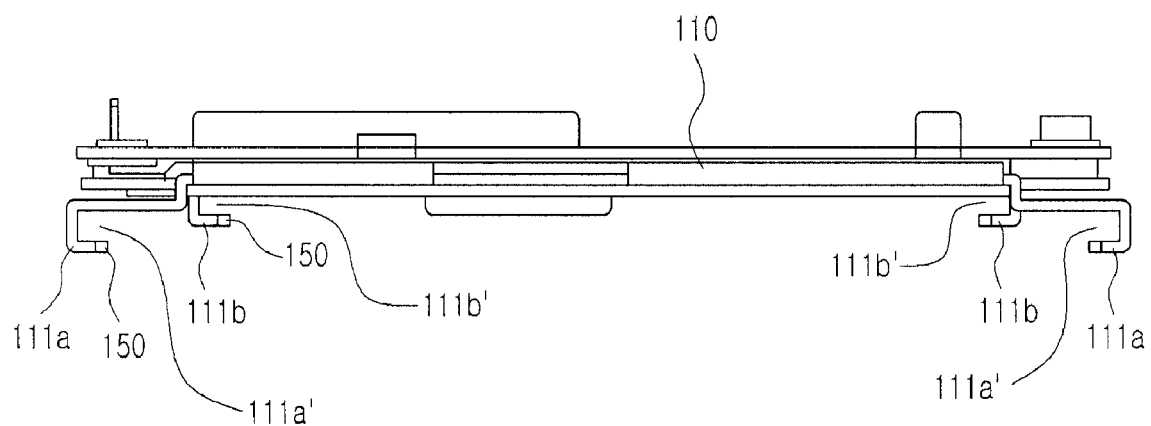
FIG. 9 is a plan view illustrating an upper side of a guide plate in a slide type portable terminal according to an embodiment of the present invention.

As shown in FIGS. 5, 8, and 9, the guide plate 110 includes a double guide member 111 engaged with the double sliding plate 120 to guide the movement of the double sliding plate 120.

Figure 7:
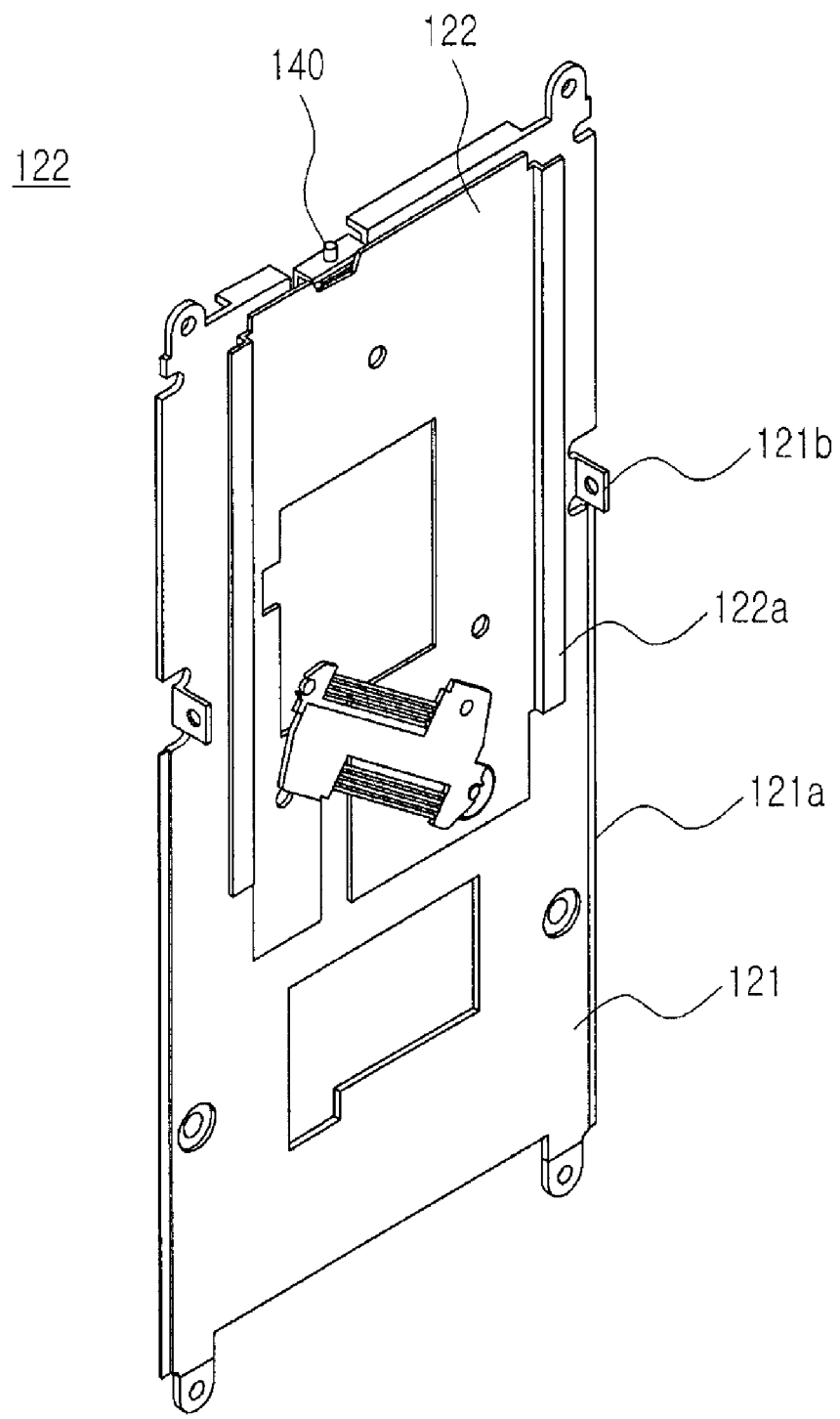
FIG. 7 is a perspective view illustrating a state where an auxiliary sliding member is assembled with a main sliding member in a slide type portable terminal according to an embodiment of the present invention.
Figure 10:
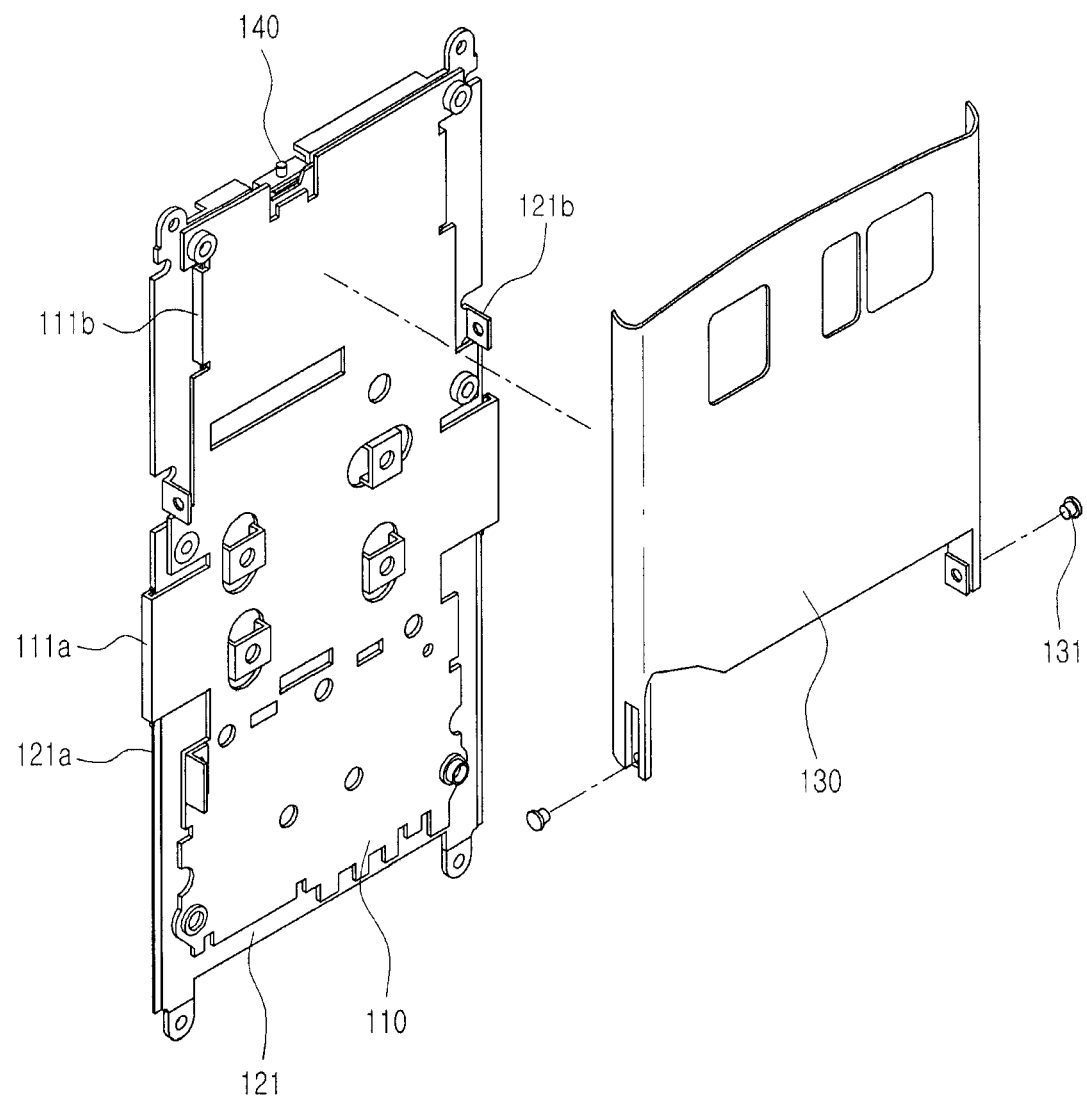
FIG. 10 is a perspective view illustrating a state where a clean back cover is mounted in an assembly state of a double sliding plate and a guide plate in a slide type portable terminal according to an embodiment of the present invention.

As shown in FIGS. 5, 7, and 10, the double sliding plate 120 includes a main sliding member 121 and an auxiliary sliding member 122. The main sliding member 121 is formed in the sliding housing so as to set in one double guide member 111. The auxiliary sliding member 122 is formed between the main sliding member 121 and the guide plate 110 and also is assembled with the main sliding member 121 so as to set in double guide member 111.

As shown in FIGS. 5, 8, 9, 11, 13, and 14, the double guide member 111 includes a first guide unit 111a and a second guide unit 111b. The first guide unit 111a is formed on both lateral surfaces of the guide plate 110 so as to set the main sliding member 121 to guide the sliding of the main sliding member 121. Further, the first guide unit 111a protrudes from both lateral surfaces of the guide plate 110 in a vertical direction. The second guide unit 111b is formed on both lateral surfaces of the guide plate 110 so as to set the auxiliary sliding member 122 to guide the sliding of the auxiliary sliding member 122.

As shown in FIGS. 8 and 9, the first guide unit 111a is formed in a "U" shape to form a first rail groove 111a'. The first rail groove protrudes from both lateral sides of the guide plate 110 and is formed in a lower part of the guide plate 110. The second guide unit 111b, may also be bent toward the main sliding member 121. The second guide unit 111b is formed in a "U" shape to form a second rail groove 111b'. The second rail groove 111b' is formed in an upper part of the guide plate 110 and bends towards the auxiliary sliding member 122.

Figure 12:
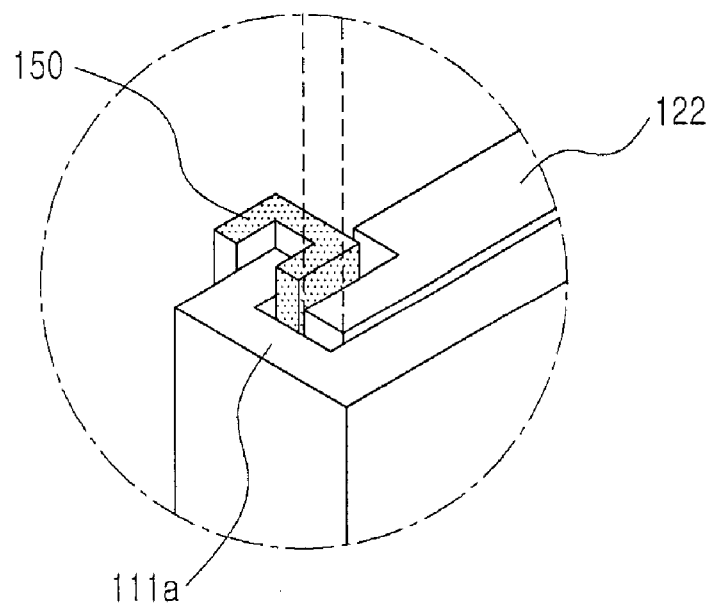
FIG. 12 is an enlarged view of A part of FIG. 11.

As shown in FIGS. 5, 9, and 12, a guide form 150 is formed in one end of the first rail groove 111a' and second rail groove 111b' so as to reduce friction in sliding and make the sliding easy.

Figure 11:
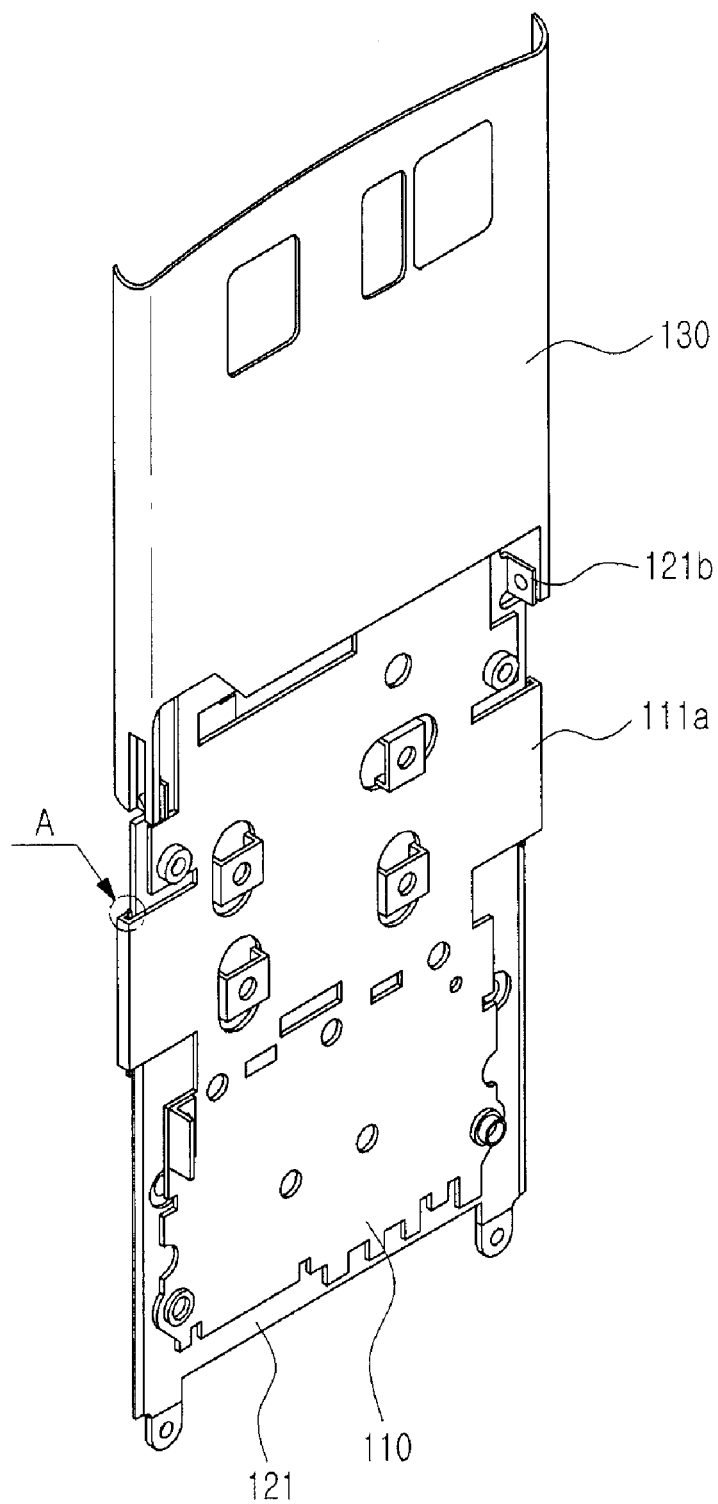
FIG. 11 is a perspective view illustrating a state where a double sliding plate mounting a clean back cover faces a guide plate in a slide type portable terminal according to an embodiment of the present invention.
Figure 14:
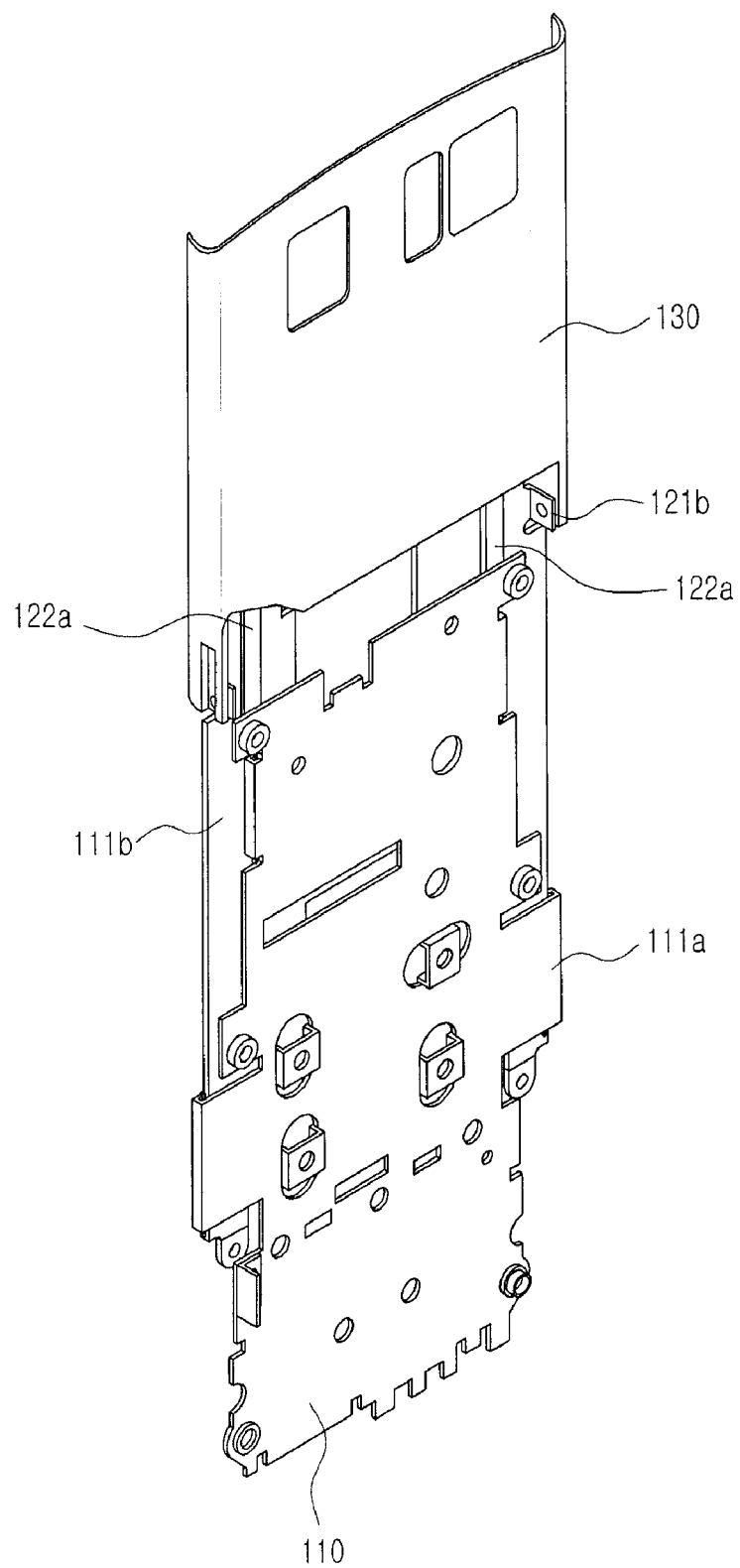
FIG. 14 is a perspective view illustrating a state where a double slide plate mounting a clean back cover slides relative to a guide plate in a slide type portable terminal according to an embodiment of the present invention.

As shown in FIGS. 10, 11, and 14, the main sliding member 121 includes a clean back cover 130 for covering the back surface of the double sliding plate 120.

As shown in FIGS. 5, 7, and 10, an assembly unit 121b for assembling the clean back cover 130 protrudes from both lateral surfaces of the main sliding member 121.

As shown in FIGS. 5, 10, 11, 13, and 14, the main sliding member 121 includes a main guide rail 121a that is slideable within the first rail groove 111a'. The auxiliary sliding member 122 includes an auxiliary guide rail 122a that protrudes from an assembly surface of the main sliding member 121 and is slideable within the second rail groove 111b'.

As shown in FIGS. 5, 7, 10, 11, 13, and 14, the main guide rail 121a is formed on both lateral surfaces of the main sliding member 121 under the assembly unit 121b. The auxiliary guide rail 122a extends from the upper side of the main sliding member 121 to a position where the auxiliary guide rail 122a is folded onto the main guide rail 121a.

As shown in FIGS. 5 and 10, the main sliding member 121 includes a stopper member 140 on the upper side thereof so that the stopper member 140 is engaged with the upper side of the guide plate 110 in the sliding of the main sliding member 121. The stopper member 140 interrupts the sliding of the main sliding member 121.

Figure 13:
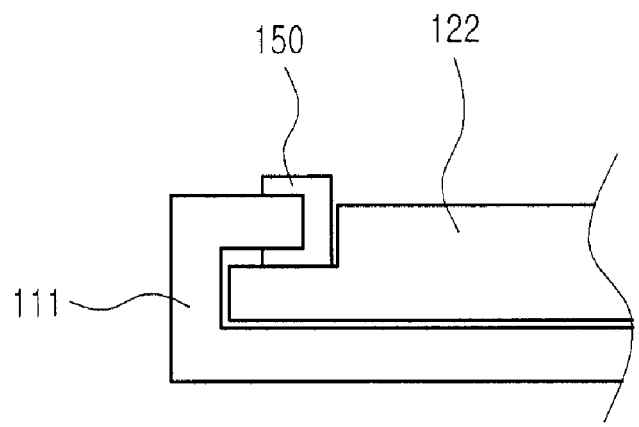
FIG. 13 is a cross-sectional view of FIG. 12.

As shown in FIGS. 11, 13, and 14, in a state of the sliding housing facing the body housing, the first rail groove 111a' sets the upper side of the main guide rail 121a and the second rail groove 111b' sets the auxiliary guide rail 122a in an internal side of the clean back cover 130. If the sliding housing slides relative to the body housing, the first rail groove 111a' guides the sliding of the main guide rail 121a and the second rail groove 111b' guides the sliding of the auxiliary guide rail 122a. When the sliding housing protrudes from the body housing, the first rail groove 111a' sets the lower side of the main guide rail 121a and the second rail groove 111b' sets the lower side of the auxiliary guide rail 122a to maintain the double assembly state.

The operation of the slide type portable terminal including the above construction according to the exemplary embodiment of the present invention will be described in more detail with reference to accompanying drawings of FIGS. 5 to 13.

As shown in FIGS. 5, 10, 11, 13, and 14, the slide type portable terminal 100 includes the body housing, the sliding housing facing the body housing to slide relative to the body housing, and the clean back cover 130 for covering the back surface of the sliding housing in the sliding of the sliding housing to improve the design attraction of the slide type portable terminal 100. The guide plate 110 and the double sliding plate 120 are formed between the body housing and the sliding housing so as to slide the sliding housing relative to the body housing.

As shown in FIGS. 5, 6, 7, 10, 11, 13, and 14, the double sliding plate 120 includes the main sliding member 121 and the auxiliary sliding member 122. The main sliding member 121 is formed in the sliding housing, faces the guide plate 110, and is engaged with the guide plate 110 to slide relative to the guide plate 110. The assembly unit 121b is formed on both lateral surfaces of the main sliding member 121 to mount the clean back cover 130, the assembly unit 121b protruding toward the guide plate 110. The described, main sliding member 121, the auxiliary sliding member 122, and the guide plate 110 are assembled in sequence, and a clean back cover 130 is then assembled with the assembly unit 121b that protrudes from the main sliding member 121 through a fastening member 131, such as a screw. The main guide rail 121a is formed on both lateral surfaces of the main sliding member 121 so that the main guide rail 121a is set in the guide plate 110 so as to slide relative to the guide plate 110. The main guide rail 121a is positioned in a lower side of the assembled unit. Further, the main sliding member 121 includes the stopper member 140 at the upper end thereof. The stopper member 140 interrupts the sliding of the main sliding member 121 through engaging the upper end of the main sliding member 121 with the upper end of the guide plate 110. Further, it is preferable that the stopper member 140 absorbs sliding force when interrupting the sliding of the main sliding member 121 to prevent a shock. The auxiliary sliding member 122 is formed smaller than the main sliding member 121 to be assembled with the main sliding member 121 so as to be set in an interior side of the main sliding member 121. The auxiliary sliding member 122 is formed between the main sliding member 121 and the guide plate 110 to slide relative to the guide plate 110. The auxiliary sliding member 122 extends in a reverse direction of the sliding direction of the main sliding member 121. The auxiliary guide rail 122a bent from the auxiliary sliding member 122 in a substantially right-angle ("L") shape is formed on both lateral surfaces of the auxiliary sliding member 122. It is preferable to form the auxiliary guide rail 122a extending from the upper side of the main sliding member 121 to the position where the auxiliary guide rail 122a is folded onto a part of the main guide rail 121a.

Further, it is preferable to include an elastic member 160 between the auxiliary sliding member 122 and the guide plate 110 for providing driving force during the sliding of the sliding housing.

As shown in FIGS. 5, 8, 9, 10, 11, 13, and 14, the guide plate 110 is formed in the body housing. The guide plate 110 is engaged with the main sliding member 121 and the auxiliary sliding member 122 of the double sliding plate 120 formed on the sliding housing, respectively, to guide the sliding of the main sliding member 121 and auxiliary sliding member 122. The guide plate 110 includes the double guide member 111 so as to set the main sliding member 121 and auxiliary sliding member 122, respectively, to guide the sliding of the main sliding member 121 and auxiliary sliding member 122. The double guide member 111 includes the first guide unit 111a and the second guide unit 111b.

As shown in FIGS. 5, 8, and 9, the first guide unit 111a is formed on both lateral surfaces of the guide plate 110, so as to set the main sliding member 121 to guide the sliding of the main sliding member 121. The first guide unit 111a protrudes from both lateral surfaces of the guide plate 110 in a vertical direction of the sliding direction so as to set the main sliding member 121 having the larger width than that of both lateral surfaces of the auxiliary sliding member 122. The first guide unit 111a includes the first rail groove 111a' bent in a "U"'shape directed towards the main sliding member 121 while protruding in a vertical direction of the sliding direction. The first rail groove 111a' sets both lateral surfaces of the main sliding member 121 to guide the sliding. Further, it is preferable to form the first rail groove 111a' on the guide plate 110 to be adjacent to the lower side of the assembly unit 121b in a state of the sliding housing facing the body housing. It is preferred that the first guide unit 111a is formed under the sliding direction in the second guide unit 111b and has the larger width than that of the second guide unit 111b so as to set the main sliding member that has the larger width than that of the auxiliary sliding member 122.

As shown in FIGS. 5, 8, and 9, the second guide unit 111b is formed on both lateral surfaces of the guide plate 110 so as to set the auxiliary sliding member 122 to guide the sliding of the auxiliary sliding member 122. The second guide unit 111b includes the second rail groove 111b' bent in a "U"'shape directed towards the auxiliary sliding member 122 in both lateral surfaces of the guide plate 110 so as to set the auxiliary sliding member 122 having the smaller width than that of both lateral surfaces of the main sliding member 121. The second rail groove 111b' sets both lateral surfaces of the auxiliary sliding member 122 to guide the sliding. Further, it is preferred that the upper part of the second rail groove 111b' is set in the internal side of the clean back cover 130 and extends to the position where the second rail groove 111b' is folded onto the first rail groove 111a' in a state of the sliding housing facing the body housing. Further, the guide form 150 is assembled with the first rail groove 111a' and second rail groove 111b'. The guide form 150 is set in the first groove 111a' and second rail groove 111b' to reduce the friction in the sliding of the main guide rail 121a and the auxiliary guide rail 122a, thereby decreasing the noise generated in the sliding and making the sliding easy.

The state of the sliding housing facing the body housing will be described with reference to FIGS. 11 and 12. In a state of the sliding housing facing the body housing, the first rail groove 111a' of the guide plate 110 sets the main guide rail 121a of the main sliding member 121. At this time, the first rail groove 111a' is engaged with the upper side of the main guide rail 121a that is adjacent to the assembly unit 121b to set the main guide rail 121a. Further, the second rail groove 111b' sets the auxiliary guide rail 122a of the auxiliary sliding member 122. The second rail groove 111b is positioned so as to be set in the upper side of the auxiliary guide rail 122a in the internal side of the clean back cover 130.

As shown in FIGS. 11 and 12, if the sliding housing slides relative to the body housing in this state, the main sliding member 121 protrudes upwardly while facing the guide plate 110. The clean back cover 130 is exposed to the outside in a state of being inserted to the body housing. The main guide rail 121a slides relative to the first rail groove 111a' in a direction distant from the assembly unit 121b. Further, the second rail groove 111b' outwardly moves from the internal side of the clean back cover 130. The auxiliary guide rail 122a slides relative to the second rail groove 111b', and at this time, slides from the upper side of the auxiliary guide rail 122a up to the position where the auxiliary guide rail 122a is folded onto the main guide rail 121a in a direction of the lower side of the assembly unit 121b.

According to the state where the sliding housing slides to protrude from the body housing as shown in FIGS. 11 and 12, the first rail groove 111a' is engaged with the lower side of the main guide rail 121 to be set and the second rail groove 111b' is engaged with the lower side of the auxiliary guide rail 122a to be set. At this time, the position of setting the first rail groove 111a' and the main guide rail 121a is a lower part of the sliding housing, and the position of setting the second rail groove 111b' and the auxiliary guide rail 122a is an upper part of the body housing.

Therefore, the double first guide and second guide units formed on the guide plate 110, the main sliding member 121, and the auxiliary sliding member 122 are assembled to achieve an increased assembly strength and to maintain the assembly state of the second rail groove with the upper side of the body housing setting the auxiliary guide rail 122a that is left in the non-assembled state after the sliding due to the assembly of the clean back cover 130.

Accordingly, the slide type portable terminal 100 increases the assembly strength, has more stable and solid assembly strength, and decreases the problems of breakage or deformation incurred in dropping.

As described above, the slide type portable terminal according to the present invention includes the double sliding member and the guide plate including the double guide member for setting the double sliding member so that both upper and lower sides of the guide plate is assembled with the double sliding member to improve the assembly strength of the double sliding plate that slides relative to the guide plate.

Further, the main sliding plate is set in the first guide unit to slide and the auxiliary sliding plate is set in the second guide unit to slide so that it is possible to maintain the assembly state of the guide plate and the sliding plate in the position of the first guide unit and second guide unit during the sliding of the sliding housing and also increases the assembly strength of the sliding housing and body housing, thereby decreasing the breakage and deformation and improve the reliability of the product.

Also, it is possible to prevent the assembly unit from being exposed to the outside during the sliding of the sliding housing, thereby improving the design attraction of the slide type portable terminal.

Further, the slide type portable terminal according to the present invention includes the double sliding assembly structure so that the assembly unit of the clean back cover can be formed in a lower position than a conventional unit and The aforementioned slide type portable terminal of the present invention is not limited to the above embodiments and drawings, and it will be understood by those skilled in the art that various changes in form and details may be made therein without departing from the spirit and scope of the invention as defined by the appended claims.

For example, in the drawings, the double sliding plate is divided into the main sliding member and the auxiliary sliding member, but it may be possible to form the auxiliary sliding member integrally with the main sliding member.

What is claimed is:

1. A slide type portable terminal comprising a body housing and a sliding housing sliding relative to the body housing while facing the body housing, wherein:
   the body housing includes a guide plate comprising a double guide member to double guide a sliding of the sliding housing; and
   the sliding housing includes a double sliding plate comprising a main sliding member and an auxiliary sliding member in which the auxiliary sliding member including an auxiliary guide rail extends in a reverse direction of a sliding direction of the main sliding member, and the main sliding member and auxiliary member are double assembled and double engaged with the double guide member of the guide plate to cause the main sliding member and the auxiliary sliding member of the sliding housing to slide relative to the body housing while maintaining double engagement with the double guide member of the guide plate during sliding of the main sliding member, the double guide member guiding the sliding of the double sliding plate;
   wherein the double guide member comprises:
      a first guide unit formed on both lateral surfaces of the guide plate and protruding from both lateral surfaces of the guide plate in a vertical direction to set and guide the sliding of a main sliding member formed in the sliding housing, the first guide unit being formed in a lower side of the guide plate; and
      a second guide unit formed on both lateral surfaces of the guide plate to set and guide the sliding of an auxiliary sliding member assembled with the main sliding member the second guide unit being formed on an upper side of the guide plate; and
   wherein the auxiliary guide rail extends from the upper side of the main sliding member to a position where the auxiliary guide rail is folded onto a part of the main guide rail.

2. The slide type portable terminal as claimed in claim 1, wherein the double sliding plate comprises:
   the main sliding member is set in the double guide member; and
   the auxiliary sliding member is formed between the main sliding member and the guide plate, and set in the double guide member to slide.

3. The slide type portable terminal as claimed in claim 1, wherein the first guide unit includes a first rail groove, the first rail groove being directed towards the main sliding member, and the second guide unit includes a second rail groove and directed towards the auxiliary sliding member.

4. The slide type portable terminal as claimed in claim 3, wherein the first rail groove and second rail groove comprise a guide form in their respective ends for reducing friction in the sliding and guiding so as to make the sliding easy.

5. The slide type portable terminal as claimed in claim 3, wherein the main sliding member comprises a clean back cover for covering a back surface of the double sliding plate.

6. The slide type portable terminal as claimed in claim 5, wherein the main sliding member comprises an assembly unit protruding from both lateral surfaces of the main sliding member to assemble the clean back cover.

7. The slide type portable terminal as claimed in claim 6, wherein the main sliding member comprises a main guide rail set in the first rail groove, and the auxiliary guide rail protrudes from an assembly surface of the main sliding member to be set in the second rail groove.

8. The slide type portable terminal as claimed in claim 7, wherein the main guide rail is formed on both lateral surfaces of the main sliding member under the assembly unit, and the auxiliary guide rail first extends vertically from an upper side of the main sliding member to a position where the auxiliary guide rail is folded to further extend horizontally with respect to said upper side in a direction of the main guide rail.

9. The slide type portable terminal as claimed in claim 8, wherein the main sliding member comprises a stopper member in an upper side, the stopper member being engaged with the upper side of the guide plate in the sliding of the main sliding member to interrupt the sliding of the main sliding member.

10. The slide type portable terminal as claimed in claim 9, wherein, in a state of the sliding housing facing the body housing, the first rail groove sets the upper side of the main guide rail and the second rail groove sets the auxiliary guide rail in an internal side of the clean back cover, if the sliding housing slides relative to the body housing, the first rail groove guides the sliding of the main guide rail and the second rail groove guides the sliding of the auxiliary guide rail, and in a state of the sliding housing protruding from the body housing, the first rail groove sets the lower side of the main guide rail and the second rail groove sets the lower side of the auxiliary guide rail to maintain the double assembly state.

11. A portable terminal comprising:

a guide plate including first guide units formed on a lower part of each lateral side of the guide plate and second guide units formed on an upper part of each lateral side of the guide plate, each of the first and second guide units being formed in a "U" to form a corresponding rail groove; and a sliding plate comprising a main sliding member and an auxiliary sliding member in which the auxiliary sliding member including an auxiliary guide rail extends in a reverse direction of a sliding direction of the main sliding member, the auxiliary sliding member being positioned between the guide plate and the main sliding member, wherein the main sliding member engages the rail groove corresponding to the first guide units and the auxiliary sliding member engages the rail groove corresponding to the second guide units maintains double-engagement with the guide plate during the sliding of the main sliding member;

wherein the main sliding member is set in the first guide unit and the auxiliary sliding member is set in the second guide unit to maintain an assembly state of the guide plate and the sliding plate in a position of the first guide unit and second guide unit during sliding of the sliding plate; and wherein the auxiliary sliding member includes an auxiliary guide rail, said auxiliary guide rail extends from the upper side of the main sliding member to a position where the auxiliary guide rail is folded onto a part of the main guide rail.

12. The terminal of claim 11, wherein an end of each rail groove includes a guide form of a friction material to reduce friction when sliding.

13. The terminal of claim 11 further comprising a stopper member on an upper side the main sliding member for interrupting the sliding of the auxiliary sliding member.

14. The terminal of clam 11, wherein the auxiliary guide rail engages the corresponding rail groove of the second guide unit.

15. The terminal of claim 11, wherein the auxiliary sliding member is smaller than the main sliding member.

* * * * *